United States Patent [19]

Ohkawa

[11] Patent Number: 5,068,543

[45] Date of Patent: Nov. 26, 1991

[54] LOW HAZARD EXTREMELY LOW FREQUENCY POWER TRANSMISSION LINE

[75] Inventor: Tihiro Ohkawa, La Jolla, Calif.

[73] Assignee: General Atomics, San Diego, Calif.

[21] Appl. No.: 613,152

[22] Filed: Nov. 14, 1990

[51] Int. Cl.⁵ .............................................. H02G 7/20
[52] U.S. Cl. ...................................... 307/91; 174/32;
174/40 R; 307/147
[58] Field of Search ............... 174/32, 40 R, 43, 45 R;
307/89, 90, 91, 147, 148; 361/107

[56] References Cited

U.S. PATENT DOCUMENTS

| 1,190,135 | 7/1916 | Faccioli | 174/127 |
| 1,625,125 | 4/1927 | Latour | 174/32 X |
| 2,008,109 | 7/1935 | Reher | 307/147 X |

FOREIGN PATENT DOCUMENTS 53-128795 10/1978 Japan ....................................... 174/32

OTHER PUBLICATIONS

Comber, et al., "Audible-Noise Reduction by Bundle Geometry Optimization", *Proc. of IEEE Power Engineering Society*, Jan. 28-Feb. 2, 1973, New York, pp. 1782-1789 (published Nov. 20, 1972).
Marino, et al., "Hazard at a Distance: Effects of Exposure to the Electric and Magnetic Fields of High Voltage Transmission Lines", *Medical Research Engineering*, vol. 12, No. 5, pp. 6-9 (Nov. 1977).
Rish, et al., "Regulating Possible Health Effects from AC Transmission Line Electromagnetic Fields", *Proc. of the IEEE*, vol. 67, No. 10, pp. 1416-1427 (Oct. 1979).
Amano, et al., "Study on Reduction in Electric Field, Charged Voltage, Ion Current and Ion Density under HVDC Transmission Lines by Parallel Shield Wires", *IEEE Transactions on Power Delivery*, vol. 4, No. 2, pp. 1351-1357 (Apr. 1989).
*Transmission Line Reference Book HVDC to +600 kv*, Chapter 7, pp. 73-96 (Electric Power Research Institute).
Electromagnetic Fields: The Jury's Still Out, *IEEE Spectrum* (Aug. 1990).
North County Report, *Times Advocate*, Sunday, Jul. 29, 1990.
Harvard Medical School Health Letter, Aug. 1990.

*Primary Examiner*—Laramie E. Askin
*Attorney, Agent, or Firm*—Fitch, Even, Tabin & Flannery

[57] ABSTRACT

Potentially harmful electromagnetic radiation associated with high voltage power transmission lines is reduced or minimized by splitting the current delivered to a load between at least three conductors, and by maintaining a specific spatial relationship between the respective conductors. Single phase transmission at reduced radiation may occur using three or four conductors spatially positioned, as viewed in a cross sectional plane, in a horizontal line or a rectangular array, respectively. Three phase transmission at reduced radiation may occur using five or six conductors spatially positioned in the corners of a rectangular array, with one conductor in the center, or a hexagonal array, respectively.

11 Claims, 5 Drawing Sheets

LOW HAZARD EXTREMELY LOW FREQUENCY POWER TRANSMISSION LINE

BACKGROUND OF THE INVENTION

The present invention relates to high voltage extremely low frequency (ELF) power transmission lines, and more particularly to a method and technique for configuring a high voltage ELF transmission line so as to minimize the health risks, if any, resulting from exposure to the electromagnetic fields associated with such high voltage transmission line.

Recent studies have suggested that electromagnetic fields from ELF power transmission lines may interact with tissue at the cellular level. See, e.g., Marino et al., "Hazard at a Distance: Effects of Exposure to the Electric and Magnetic Fields of High Voltage Transmission Lines," *Medical Research Engineering*, Vol. 12, No. 5, pp 6-9 (Nov. 1977). In response, the Office of Technology Assessment (OTA), of the United States Government, has released a report that acknowledges that electromagnetic fields may pose a public health problem. See "Biological Effects of power Frequency Electric and Magnetic Fields." by Indira Nair, M. Granger Morgan and H. Keith Florig, 103 pp., Office of Technology assessment, U.S. Congress, OTA-BP-E-53, U.S. Government Printing Office, Washington D.C., May 1989. As a result, property values near ELF transmission lines have declined.

In order to reduce the possible health risk associated with ELF power transmission lines, the OTA has called for avoidance of high power transmission lines, right-of way widening associated with high power transmission lines, and new designs of high power transmission lines. While some headway has been made in the first two of these areas (avoidance and right-of-way widening), there have been no new transmission line designs proposed of which applicant is aware. Hence, there is a clear need in the art for new ELF power transmission line designs and methods of ELF power transmission that reduce electromagnetic radiation associated with such transmission lines.

SUMMARY OF THE INVENTION

In accordance with one aspect of the present invention, potentially harmful electromagnetic radiation associated with high voltage power transmission lines is reduced or minimized by splitting the current delivered to a load between at least three transmission line conductors, and by maintaining a specific spatial relationship between the respective conductors. The specific spatial relationship is designed to cause the electromagnetic fields generated by the electrical currents in each of the conductors to subtractively interact with the electromagnetic fields generated by the electrical currents in the other conductors at prescribed surface location(s) beneath or near the transmission line, thereby reducing the electromagnetic radiation at the prescribed location(s).

Advantageously, the present invention provides for the transmission of high voltage power from a source of electrical power to a load in accordance with either a single phase transmission line or a three phase transmission line.

One embodiment of a single phase transmission line utilizes three conductors that are spatially positioned, as viewed in a cross sectional plane of the transmission line, in a horizontal line. A center conductor is equidistant from the outer two conductors. The center conductor carries an electrical current to or from the load that is twice as large, and of the opposite polarity, as the electrical currents carried in the outer two conductors.

Another embodiment of a single phase transmission line utilizes four conductors that are spatially positioned, as viewed in a cross sectional plane of the transmission line, in a diamond or square array. One of the four conductors is positioned in each corner of the array. The current delivered to a load using this four-conductor single-phase transmission line is shared equally between the four conductors. A first pair of the conductors, positioned in opposite corners of the array, carries equal electrical currents to or from the load of the same polarity. A second pair of the conductors, also positioned in opposite corners of the array, carries equal currents from or to the load of the opposite polarity as the first pair of conductors.

One embodiment of a three phase transmission line in accordance with the present invention utilizes five conductors that are spatially positioned, as viewed in a cross sectional plane of the transmission line, in the center and corners of a rectangular array. In accordance with this configuration, the conductor in the center of the rectangular array carries a first phase electrical current to or from the load. A first pair of conductors, positioned in opposite corners of the array, carries second phase electrical currents to or from the load. Another pair of conductors, also positioned in opposite corners of the array, carries third phase electrical currents to or from the load. The second and third phase currents carried in each electrical conductor in the respective corners of the array are equal to one half of the first phase current carried in the center conductor.

Still another embodiment of a three phase transmission line utilizes six conductors that are spatially positioned, as viewed in a cross sectional plane of the transmission line, in the corners of a hexagonal array.

Generally, then, the present invention may be characterized as comprising a power line distribution system for distributing high voltage electrical power from a power source to a desired load, where such power line distribution system includes at least three power line conductors. These power line conductors are connected to appropriate terminals of the power source and the load so that each carries an electrical current to or from the load as the high voltage electrical power is delivered to the load. Further, spatial positioning means are used for maintaining a prescribed spatial relationship between the power line conductors. This prescribed spatial relationship is designed so that the electromagnetic fields generated around a first group of the power line conductors, as sensed in a region of interest near the power line conductors, opposes or subtractively interacts with electromagnetic fields generated around a second group of the at least three power line conductors, as also sensed in the region of interest. Hence, the magnitude of the net electromagnetic field sensed in the region of interest is reduced, thereby also reducing the harmful effects, if any, that might otherwise result from exposure to the electromagnetic field in the region of interest.

The present invention may also be viewed as simply a high voltage power line spatial arrangement for use with a single phase transmission line or a three phase transmission line that minimizes the possible harmful health effects of power line electromagnetic radiation. The single phase transmission line spatial arrangement utilizes three or four conductors spatially arranged as described above, i.e., equally spaced in a line or square array as viewed in a cross sectional plane of the transmission line. The three phase transmission line spatial arrangement utilizes five or six conductors spatially arranged as described above, i.e., in specifically defined ordered arrays as viewed in a cross section plane of the transmission line.

The present invention may further be viewed as a method of reducing the possible harmful health effects of electromagnetic radiation associated with a high voltage power transmission line. Such method involves a first step of splitting or sharing the electrical current delivered to or returned from a load via the high voltage power transmission line between at least three conductors. Each conductor thereby has an electromagnetic field generated therearound having a polarity and magnitude proportional to the current flowing in that conductor. A second step of the method includes positioning the electrical conductors in an ordered array, as viewed in a cross sectional plane of the transmission line, so that the electromagnetic fields generated around each of the conductors subtractively interact at a prescribed distance away from the transmission line. Advantageously, using this method, the electromagnetic radiation sensed at the prescribed distance from the transmission line is reduced.

It is thus a feature of the present invention to provide a high power transmission line that reduces the electromagnetic radiation surrounding the transmission line.

It is another feature of the invention to provide such a high power transmission line that thereby minimizes the possible health risks associated with long-term exposure to or presence in zones surrounding high power transmission lines.

It is still another feature of the invention to provide respective particular spatial arrangements for use with a three or four conductor single phase high voltage transmission line that minimizes electromagnetic radiation surrounding the conductors.

It is a related feature of the invention to provide respective additional particular spatial arrangements for use with a five or six conductor three phase high voltage transmission line that likewise minimizes electromagnetic radiation surrounding the conductors.

BRIEF DESCRIPTION OF THE DRAWINGS

The above and other aspects, features and advantages of the present invention will be more apparent from the following more particular description thereof, presented in with the following drawings wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
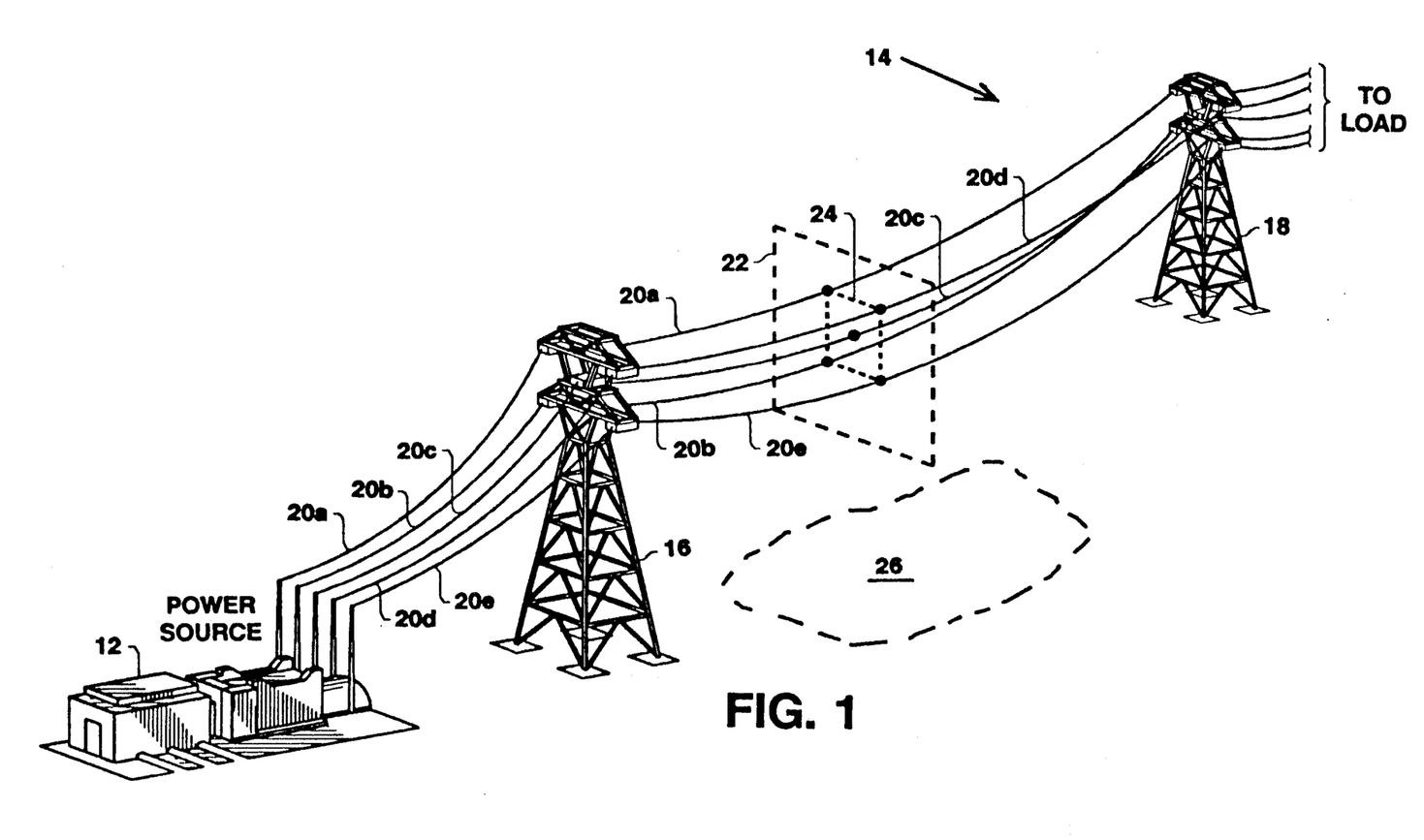
FIG. 1 illustrates a three phase high voltage power transmission line made in accordance with one embodiment of the present invention.

Referring first to FIG. 1, a three phase high voltage power transmission line 14 made in accordance with one embodiment of the present invention is illustrated. The transmission line 14 carries three phase power from a power source 12, such as a power generating plant, to a desired load, not shown. The load to which the power is delivered is typically a power substation. At the substation, the high voltage power available from the power line is converted to a lower voltage suitable for distribution to end users of the power, such as commercial and residential buildings.

The embodiment illustrated in FIG. 1 utilizes five separate electrical conductors, 20a, 20b, 20c, 20d and 20e. These conductors are supported along the length of the transmission line by a plurality of spaced-apart towers, or equivalent support structures. Two such towers 16 and 18 are shown in FIG. 1, but it is to be understood, of course, that a large number of such towers will be utilized along the length of typical high voltage transmission line. For example, a typical transmission line may span many miles, e.g. 100 miles, and a support tower 16, or equivalent, is needed at regular intervals along the 100 miles, e.g., every 0.1 mile.

An important part of the present invention is the spatial arrangement of the electrical conductors of the transmission line in those regions where exposure to electromagnetic radiation associated with the transmission line is to be minimized. For example, as illustrated in FIG. 1, and as viewed in a cross sectional plane 20 of the transmission line 14, the spatial arrangement of the conductors 20a–20e is maintained in an orderly array. For the five-conductor embodiment shown in FIG. 1, this array, as viewed in the cross sectional plane 22, is that of a rectangle 24, with the conductors 20a, 20b, 20d and 20e being positioned in the respective corners of the rectangle, and the conductor 20c being spatially positioned in the center of the rectangle. The significance of this particular spatial arrangement for a five-conductor three-phase transmission line is explained more fully below. Other spatial arrangements for other transmission lines utilizing less or more than five conductors are also used as described below.

Another important part of the present invention, described more fully below, is the distribution of the electrical current between the conductors 20a–20e of the transmission line 14. In general, the electrical current is split or divided between the various conductors of the transmission line in order to cause the electromagnetic fields associated with each current to subtractively interact in a region 26 proximate the transmission line where the electromagnetic radiation is to be reduced. For example, for the five-conductor, three-phase transmission line 14 shown in FIG. 1, the conductors in opposite corners of the rectangular array 24, e.g., the conductor pair comprising conductors 20a and 20e, and the conductor pair comprising conductors 20b and 20d, carry equal currents for two of the three phases. The current for the third phase is carried in the conductor 20c in the center of the array 24. Other distributions of electrical currents between the various conductors for other spatial configurations of the conductors are described below.

It will readily be appreciated that the embodiment shown in FIG. 1 requires two additional conductors, e.g., conductors 20d and 20e, over the number of conductors required in prior art three phase transmission lines. The additional conductors 20d and 20e thus represent an added expense over the prior art transmission lines. However, the additional conductors advantageously provide a reduced electromagnetic field underneath or near the transmission line, e.g., in a region 26 below the transmission line. Thus, the benefits of this reduced electromagnetic field are believed to more than justify the added expense of the additional conductors.

In order to better understand how the spatial arrangement of the conductors in the transmission line influences the magnitude of the electromagnetic radiation around a transmission line, an intuitive analysis of the magnetic fields around a transmission line will next be presented in conjunction with FIGS. 2A, 2B, 3A and 3B. This intuitive analysis will be followed by a more rigorous mathematical analysis.

Figure 2A:
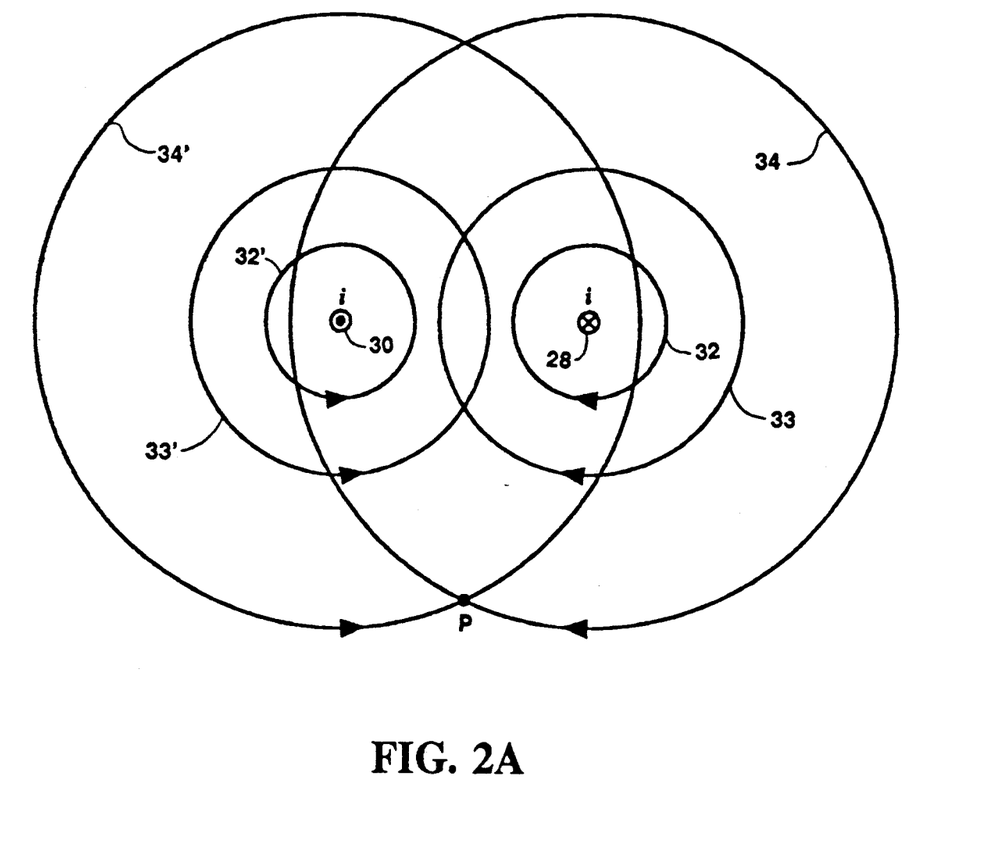
FIG. 2A schematically illustrates the magnetic fields generated around each conductor of a conventional two-conductor single phase high voltage transmission line.

In FIG. 2A, a schematic representation of the magnetic fields generated around each conductor of a conventional two-conductor single phase high voltage transmission line is depicted. (A similar representation of the electric fields could also be presented, but for simplicity only the magnetic fields are shown. In general, the magnitude and polarity of the electric fields vary proportionally with the magnitude and phase of the magnetic fields.)

In a single phase power transmission line, the currents in the respective conductors are 180° out of phase, with one conductor carrying current in one direction to or from a load, and the other conductor carrying an equal current in the opposite direction from or to the load. The two conductors are shown in crosssection, with a first conductor 28 carrying current into the drawing (represented by an "x"), and a second conductor 30 carrying current out of the drawing (represented by a ".").

As is known from fundamental principles of physics, a magnetic field is established around a conductor carrying an electrical current. More particularly, for a long straight wire carrying a current i, the magnetic field B around the wire may be determined from Ampere's law as $$B = \frac{M_0 i}{2\pi r},$$

where r is the distance from the wire and $M_0$ is the permeability constant ($M_0 = 4\pi \times 10^{-7}$ weber/amp-m). It is thus seen that for this simple case (of a single conductor) the magnitude of the magnetic field varies inversely with the distance from the conductor. The magnetic field generated around each conductor 28 and 30 is thus represented schematically in FIG. 2A as a series of iso-magnetic circles (drawn with solid lines), with each circle representing a magnetic field of a particular magnitude. The iso-magnetic circles are drawn in FIG. 2A such that each iso-magnetic circle represents a magnetic field having a magnitude that is one-half of the magnitude of the magnetic field along the next smallest iso-magnetic circle. Further, the iso-magnetic circles drawn around conductor 28—circles 32, 33, 34—are drawn so as to correspond to equal iso-magnetic circles drawn around conductor 30 —circles 32', 33' and 34'. Hence, the iso-magnetic circle 34 schematically represents a magnetic field having a magnitude equal to the magnitude of the magnetic field along the isomagnetic circle 34', and equal to one half of the magnitude of the magnetic field along the iso-magnetic circles 33 and 33'. Similarly, the iso-magnetic circles 33 and 33' respectively represent magnetic fields having a magnitude equal to one half of the magnitude of the magnetic fields along the iso-magnetic circles 32 and 32'. The polarity of the magnetic fields is schematically represented by the arrowheads placed on the iso-magnetic circles. Because equal currents are flowing in each conductor, but of opposite polarity, the polarity of the magnetic fields generated around the conductors is also opposite. (The polarity of a magnetic field around a current-carrying conductor may be determined by the "right-hand rule": grasp the wire with the right hand, the thumb pointing in the direction of the current. The fingers will curl around the wire in the direction of the magnetic field.)

Figure 2B:
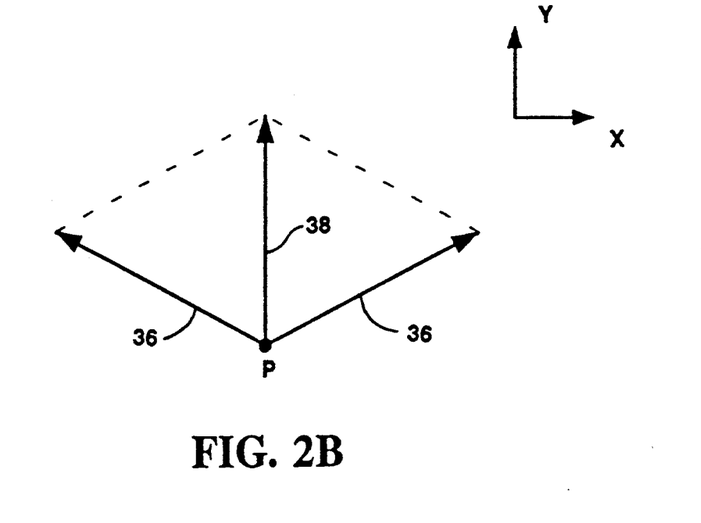
FIG. 2B is a magnetic field vector diagram quantatively illustrating the magnitude of the net magnetic field at a point P spaced a prescribed distance from the transmission line of FIG. 2A.

FIG. 2B is a magnetic field vector diagram quantitatively illustrating the magnitude and polarity of the net magnetic field at a point P spaced a prescribed distance from the transmission line of FIG. 2A. The net magnetic field is represented by a vector 38 that is the sum of the individual magnetic vectors 36 and 36' present at the point P. The vector 36 is drawn to represent the magnitude and direction of the magnetic field along the iso-magnetic circle 34 at the point P (FIG. 2A). Similarly, the vector 36' is drawn to represent the magnitude and direction of the magnetic field along the iso-magnetic circle 34' at the point P. These vectors add to produce the net magnetic field vector 38 as shown. Assuming an x-y coordinate system as shown in FIG. 2B, this vector addition is performed by adding the x and y components of each of the vectors 36 and 36'. In performing this addition, the x components of the vectors 36 and 36' cancel, and the y components add. Hence, as seen in FIG. 2B, the net magnetic field at the point P may be represented by the vector 38.

It should be pointed out that the electrical currents in a high voltage transmission line, such as the line 14 shown in FIG. 1, are typically alternating at an extremely low frequency, e.g., 60 Hz. The field and vector representations shown in FIGS. 2A and 2B are also thus alternating both in magnitude and polarity. However, for purposes of this intuitive analysis, it may be assumed that a particular recurring value, e.g., the peak value, is represented in the diagrams.

Figure 3A:
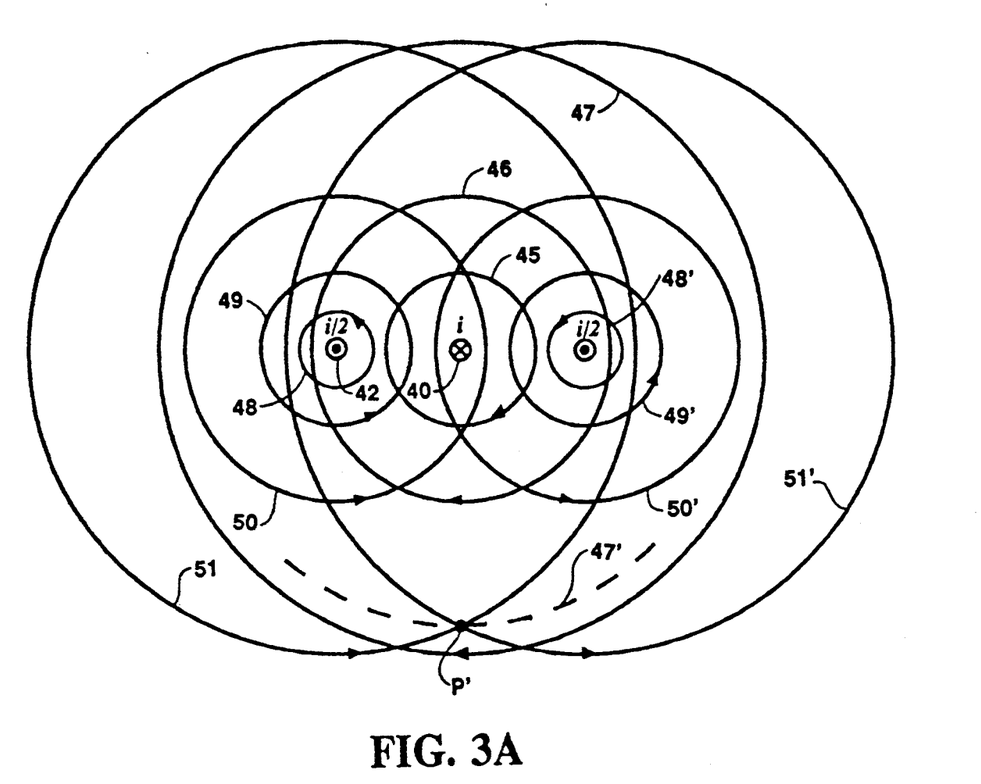
FIG. 3A schematically illustrates the magnetic fields generated around each conductor of a single phase high voltage transmission line spatially arranged in accordance with the present invention.
Figure 3B:
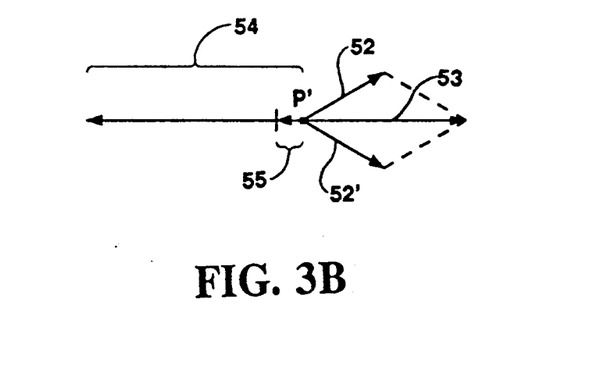
FIG. 3B is a magnetic field vector diagram quantatively illustrating the magnitude of the net magnetic field at a point P' spaced a prescribed distance from the transmission line of FIG. 3A.

Referring next to FIGS. 3A and 3B, diagrams similar to FIGS. 2A and 2B are shown for a single phase transmission line configuration made in accordance with the present invention. That is, FIG. 3A schematically illustrates the magnetic fields, using iso-magnetic circles, generated around each conductor of a three-conductor single phase high voltage transmission line spatially arranged in accordance with one embodiment of the present invention. This spatial configuration places a first conductor 40 equidistant from second and third conductors 42 and 44. For comparison purposes, the outer two conductors 42 and 44 are spaced apart the same distance as are the two conductors 28 and 30 of FIG. 2A. All three conductors, as viewed in a cross sectional plane of the transmission line (as shown in FIG. 3A) are aligned in a generally horizontal line. The center conductor 40 carries a current, i, to or from a load. The outer two conductors 42 and 44 each carry one half of the current, i/2, from or to the load. The current i in the center conductor is represented as an "x", signifying the current is flowing into the diagram. The current i/2 in the outer two conductors 42 and 44 is represented as a ".", signifying the current is flowing out of the diagram.

Still referring to FIG. 3A, iso-magnetic circles 45, 46 and 47 are drawn around the center conductor 40, representing the decreasing magnetic field that is generated around the center conductor 40 due to the current i flowing therethrough. As with the iso-magnetic circles shown in FIG. 2A, the iso-magnetic circles 45, 46 and 47 are drawn in FIG. 3A such that each iso-magnetic circle represents a magnetic field having a magnitude that is one-half of the magnitude of the magnetic field along the next smallest iso-magnetic circle.

Similarly, iso-magnetic circles 48, 49, 50 and 51 are drawn around the outer conductor 42, representing the decreasing magnetic field that is generated around the conductor 42 due to the current i/2 flowing therethrough. Additional iso-magnetic circles 48', 49', 50' and 51' are drawn around the conductor 44 due to the current i/2 flowing therethrough. The iso-magnetic circles 45, 48 and 48' represent equal magnetic fields. Similarly, the iso-magnetic circles 46, 49 and 49' represent equal magnetic fields, as do the iso-magnetic circles 47, 50 and 50'. However, because the current i in the center conductor 40 is twice as large as the currents i/2 in the outer conductors 42 and 44, and further because the magnitude of the magnetic field is directly proportional to the magnitude of the current, the location (radius) of the equal iso-magnetic circles is proportionally different. That is, the iso-magnetic circle 45, for example, is farther from the conductor 40 than are the iso-magnetic circles 48 and 48' (representing magnetic fields of equal magnitude as the iso-magnetic circle 45) from the outer conductors 42 and 44, respectively. Said another way, the larger electrical current in the center conductor 40 generates a stronger magnetic field around the conductor 40 than the smaller electrical currents in the outer conductors generate around the outer conductors 42 and 44.

As with FIG. 2A, it is noted that the polarity of the magnetic fields represented by the iso-magnetic circles in FIG. 3A is represented by the arrowheads included on the various circles.

Assuming a point P' centered below a transmission line as shown in FIG. 3A, spaced below the transmission line the same distance as is the point P in FIG. 2A, the relative strength and polarity of the net magnetic field sensed at the point P' can be quantitatively approximated using a magnetic field vector diagram as shown in FIG. 3B. Thus, in FIG. 3B, a first vector 52 is drawn to represent the magnitude and polarity of the magnetic field along the iso-magnetic circle 51 at the point P'. This vector 52 thus represents the magnetic field at point P' resulting from the current i/2 in the outer conductor 42. Similarly, a second vector 52' is drawn to represent the magnitude and polarity of the magnetic field along the iso-magnetic circle 51' at the point P'. Both vectors are scaled appropriately relative to length of the vectors 36 and 36' used in FIG. 2B. More particularly, because the currents in conductors 42 and 44 are one-half of the current in conductors 28 and 30 (FIG. 2A), the strength of the magnetic field will be one-half at the same distance. Hence, vectors 52 and 52' are, drawn to be one-half of the length of the vectors 36 (FIG. 2B). The vectors are drawn at the same angle as a tangent to the respective iso-magnetic circles 51 and 51' at point P'. Vector addition of the two vectors 52 and 52' results in the vector 53. A third vector 54 represents the magnitude and polarity of the magnetic field along iso-magnetic circle 47' (only a portion of which is shown in FIG. 3A). This vector 54 has a length scaled appropriately based on the ratio of the radius of iso-magnetic circle 47 to iso-magnetic circle 47'. As drawn in FIG. 3A, this ratio is roughly 1.1. The direction of vector 54 in FIG. 3B is that of a tangent to the iso-magnetic circle 47' at point P'. Vector addition of the vector 54 with the vector 53 results in a net magnetic vector 55, representing the magnitude and polarity of the net magnetic field at the point P'.

As indicated, for comparative purposes, FIGS. 2A and 2B and 3A and 3B are drawn to the same scale. That is, it is assumed that the current flowing in the conductor 28 in FIG. 2A is of the same magnitude and polarity as the current i flowing in the center conductor 40 in FIG. 3A. Hence, the iso-magnetic circles 32, 33 and 34 of FIG. 2A correspond to the magnetic fields of the same magnitude and polarity as are represented by the iso-magnetic circles 45, 46 and 47 of FIG. 3A. Similarly, the magnitude and polarity (phase) of the vectors drawn in FIGS. 2B and 3B are drawn to the same scale. Hence, a comparison of the relative sizes of the net magnetic vectors 38 and 55 provides a quantitative indication of the reduction in the net magnetic field at looation P' for a transmission line configured n accordance with the present invention.

As seen in FIGS. 2B and 3B, for example, the vector 55 is roughly 0.2 of the length of the vector 38. Hence, it can be anticipated that the particular single-phase three conductor transmission line shown in FIG. 3A would produce a magnetic field at a point directly below the transmission line that has a magnitude approximately 20% of the magnitude of the magnetic field produced at an equivalent point below a conventional two-conductor single phase transmission line. A similar reduction in the electric field will also be achieved.

As with FIGS. 2A and 2B, it is noted that the field and vector representations shown in FIGS. 3A and 3B alternate both in magnitude and polarity. However, for purposes of a quantitative intuitive analysis presented above, it may be assumed that a particular recurring value, e.g., the peak value, is represented in the diagrams.

Figure 4A:
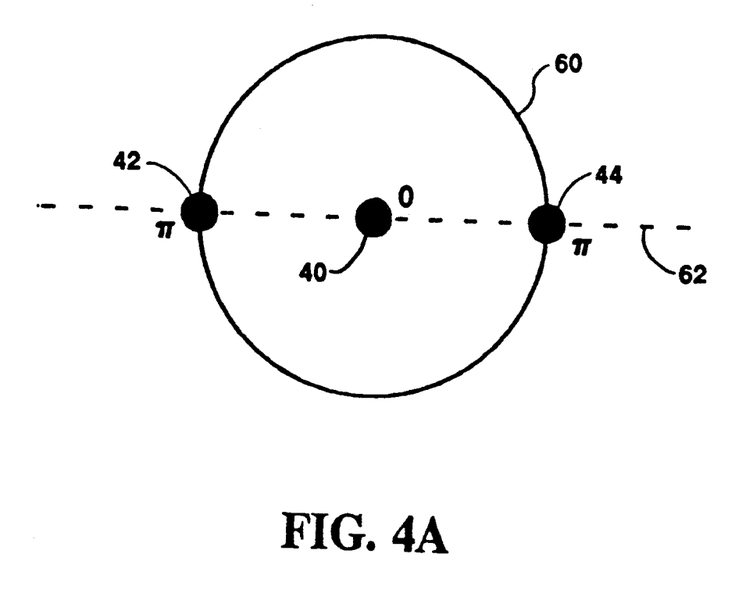
FIG. 4A is a sectional view of the spatial arrangement of a three-conductor single phase transmission line made in accordance with the present invention.
Figure 4B:
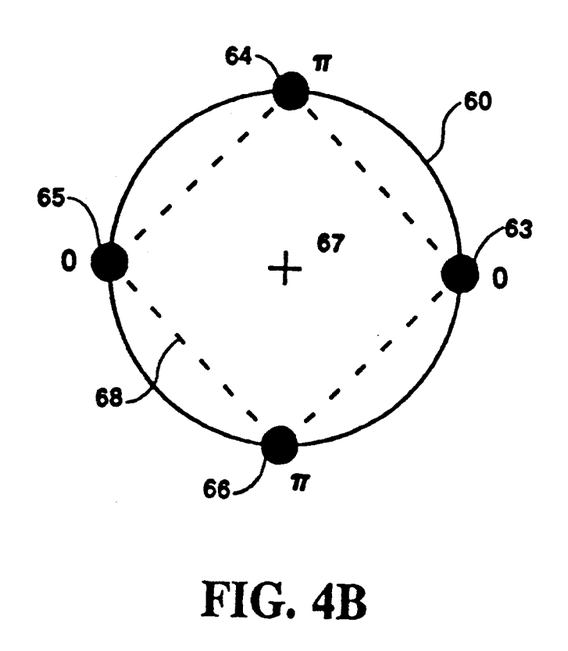
FIG. 4B is a sectional view of the spatial arrangement of a four-conductor single phase transmission line made in accordance with the present invention.

Referring next to FIGS. 4A-4B, specific spatial configurations of high voltage transmission lines made in accordance with the present invention are illustrated. All figures show the transmission lines as seen in a cross sectional plane of the transmission line. Any suitable support structure may be used at each tower of the transmission line to maintain the desired spatial relationship.

FIG. 4A is a sectional view of the spatial arrangement of a three-conductor single phase transmission line made in accordance with the present invention. FIG. 4A is thus equivalent to the spatial arrangement shown in FIG. 3A, and equivalent reference numerals are used to represent like conductors. The circle 60 included in FIG. 4A is for reference only, and emphasizes that the two outer conductors 42 and 44 are equidistant from the center conductor 40. (This circle 60 also serves to define polar coordinates used in the more detailed mathematical description of the invention presented below.) The reference circle has a radius a. The three conductors are preferably aligned in a straight line, as represented by the dashed line 62. (Using polar coordinates, the two outer conductors are located at an angle $\theta$ of 0 and $\pi$ radians.) In general, in order to achieve the highest reduction of the electromagnetic fields sensed below the transmission line, the straight line 62 should be oriented to be more or less horizontal with the surface area over which the transmission line passes. The "0" symbol near the center conductor 40 signifies the relative phase of the current in that conductor. Similarly, the "$\pi$" symbol near the outer conductors 42 and 44 signifies a phase of x radians relative to the phase of the center conductor.

FIG. 4B shows a sectional view of the spatial arrangement of a four-conductor single phase transmission line made in accordance with the present invention. As seen in this figure, four conductors 63, 64, 65 and 66 are spatially positioned in an orderly array. All conductors are equidistant from a center reference point. Hence, all conductors lie on the circle 60, which circle is centered at the point 67. Further, the four conductors are arranged in an orderly array. This orderly array is a square 68, with one of the four conductors being in each corner of the square. The conductors 63 and 65, in opposite corners of the array 68, conduct equal currents having a relative phase of 0 radians. The conductors 64 and 66, also in opposite corners of the array 68, conduct equal currents having a relative phase of x radians.

Figure 4C:
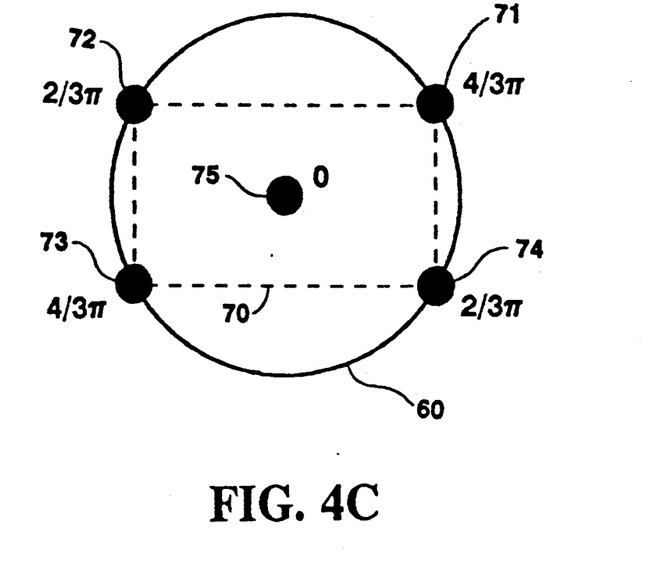
FIG. 4C is a sectional view of the spatial arrangement of a five-conductor three phase transmission line made in accordance with the present invention.

FIG. 4C shows a sectional view of the spatial arrangement of a five-conductor three phase transmission line made in accordance with the present invention. This spatial arrangement is similar to that shown in FIG. 1. As seen in FIG. 4C, five conductors are arranged in an ordered array. This ordered array has the appearance of a rectangle 70, with electrical conductors 71, 72, 73 and 74 being placed in the respective corners of the rectangle 70. A fifth conductor 75 is placed in the center of the array 70. The conductors 71, 72, 73 and 74 are all equidistant from the center conductor 75, and hence fall on the reference circle 60. This center conductor 75 carries a current i having a relative phase of 0 radians. The conductors 71 and 73 are positioned in opposite corners of the rectangular array 70, and each carries a current of i/2 having a relative phase of $4\pi/3$ radians. Similarly, the conductors 72 and 74 are also positioned in opposite corners of the rectangular array 70, and each carries a current of i/2 having a relative phase of $2\pi/3$ radians.

Figure 4D:
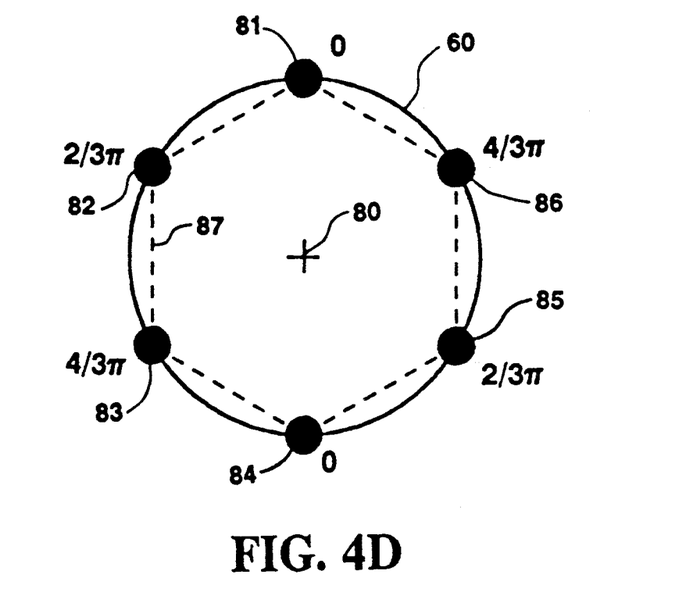
FIG. 4D is a sectional view of the spatial arrangement of a six-conductor three phase transmission line made in accordance with the present invention.

FIG. 4D shows a sectional view of the spatial arrangement of a six-conductor three phase transmission line made in accordance with the present invention. As seen in FIG. 4D, six conductors, 81, 82, 83, 84, 85 and 86 are equally spaced from the center 80 of the reference circle 60. Further, the six conductors are equally spaced around the circumference of the reference circle 60. As such, the six conductors 81-86 define a hexagon array 87, with one conductor being in each corner of the hexagon array. The conductors 81 and 84 are positioned in opposing corners of the hexagon array 87, as are the conductors 82 and 85, and the conductors 83 and 86. The conductors 81 and 84 each carry a current of i/2 having a relative phase of 0 radians. The conductors 82 and 85 likewise each carry a current of i/2 at a relative phase of $2\pi/3$ radians. Similarly, the conductors 83 and 86 each carry a current of i/2 at a relative phase of $4\pi/3$ radians.

A more detailed technical (mathematical) description of the electromagnetic fields generated by the various high voltage power line configurations shown in FIGS. 4A-4D will next be presented. In this presentation, it is assumed that the transmission line is straight, that is, sagging of the conductors due to gravity is ignored. This assumption is made to simplify the calculation, and the effect of sagging can readily be taken into account at a later time. Further, polar coordinates are used.

A single phase two conductor transmission line of the prior art is considered first. The positive conductor and the negative conductor are separated by the distance 2a. Each carries the current I. Polar coordinates are used to define where the conductors are located at $\theta=0$ and $\pi$ at r=a. The magnetic field around the conductors may be expressed as $$\psi + i\chi = \frac{\mu_0 I}{2\pi} \left\{ \ln\left(\frac{r}{a} e^{i\theta} - 1\right) - \ln\left(\frac{r}{a} e^{i\theta} + 1\right) \right\} \quad (1)$$

where $\psi$ and $\chi$ are the vector and the scaler potentials. The magnitude of the magnetic field B is given by $$|B| = \left| \frac{\partial}{\partial r} (\psi + i\chi) \right|. \quad (2)$$

The differentiation of Eq. (1) yields $$|B| = \frac{\mu_0 I}{\pi a} \left[ \left(\frac{r}{a}\right)^4 - 2\left(\frac{r}{a}\right)^2 \cos 2\theta + 1 \right]^{-\frac{1}{2}} \quad (3)$$

The maximum value $|B|_{max}$ at a distance r from the transmission line is given in terms of $\theta$ by the expression $$|B|_{max} = \frac{\mu_0 I}{\pi a} \left[ \left(\frac{r}{a}\right)^2 - 1 \right]^{-1} \quad (4)$$

$$\approx \frac{\mu_0 I}{\pi} \frac{a}{r^2} \quad \text{for } r >> a. \quad (5)$$

In accordance with the present invention, this field may be reduced by using a quadrupole configuration, as shown in FIG. 4B. The positive conductors are placed at $\theta=0$ and $\pi$ and the negative lines are at $\theta=\pi/1$ and $3\pi/2$. Each carries a current I/2. The field is $$\psi + i\chi = \frac{\mu_0 I}{4\pi}\left\{ \ln\left(\frac{r}{a}e^{i\theta} - 1\right) + \ln\left(\frac{r}{a}e^{i\theta} + 1\right) - \right. \tag{6}$$

$$\left. \ln\left(\frac{r}{a}e^{i\theta - i\pi/2} - 1\right)\ln\left(\frac{r}{a}e^{i\theta + i\pi/2} - 1\right)\right\}$$

The magnitude of the field is given by $$|B| = \frac{\mu_0 I r}{\pi a^2}\left\{\left(\frac{r}{a}\right)^8 - 2\left(\frac{r}{a}\right)^4 \cos 4\theta + 1\right\}^{-\frac{1}{2}}. \tag{7}$$

The maximum value of the field is given by $$|B|_{max} = \frac{\mu_0 I r}{\pi a^2}\left[\left(\frac{r}{a}\right)^4 - 1\right]^{-1} \tag{8}$$

$$\approx \frac{\mu_0 I a^2}{\pi r^3} \quad \text{for } r >> a. \tag{9}$$

A comparison of Eqs. (5) and (9) readily shows the reduction obtained using the quadrupole configuration.

To further emphasize the reduction in the field, consider the distances $r_d$ and $r_q$ for the dipole and the quadrupole to obtain the same field strength. These distances $r_d$ and $r_q$ must satisfy $$r_q \approx (a r_d^2)^{\frac{1}{3}}$$

or $$r_q/r_d \approx (a/r_d)^{\frac{2}{3}} \tag{10}$$

Hence, it is readily apparent that $r_q$ is significantly smaller than $r_d$, meaning that the field strength at a given distance r from the transmission line will always, be less for the quadrupole configuration than it is for the dipole configuration.

An alternative configuration is to put one conductor at $r=0$ with the current I. Another conductor is placed at $r=a$, $\theta=0$ with the current $-I/2$, and still another conductor is placed at $r=a$, $\theta=\pi$ with the current $-I/2$ (FIG. 4A). The field around the conductor is:

$$\psi + i\chi = \tag{11}$$

$$\frac{\mu_0 I}{4\pi}\left[2\ln\left(\frac{r}{a}e^{i\theta}\right) - \ln\left(\frac{r}{a}e^{i\theta} - 1\right) - \ln\left(\frac{r}{a}e^{i\theta} + 1\right)\right].$$

The field strength is given by $$|B| = \frac{\mu_0 I}{2\pi r}\left[\left(\frac{r}{a}\right)^4 + 1 - 2\left(\frac{r}{a}\right)^2 \cos 2\theta\right]^{-\frac{1}{2}} \tag{12}$$

and $$|B|_{max} = \frac{\mu_0 I}{2\pi r}\left[\left(\frac{r}{a}\right)^2 - 1\right]^{-1} \approx \frac{\mu_0 I a}{2\pi r^3} \tag{13}$$

for $r >> a$.

A safe distance from the transmission line may be calculated as $$r_q = [a r_d^2/2]^{\frac{1}{3}} \tag{14}$$

For example, assuming $a = 2.5$ meters, and a dipole safe distance of $r_d = 120$ meters, Eq. (14) shows that an equivalent safe distance for the configuration shown in FIG. 4A is $r_q = 26$ meters. Thus, if the height of the transmission line towers is higher than 26 meters, any radiation hazard is virtually eliminated.

A three-phase transmission line is next considered. To make the analysis simpler, the field of each conductor is expanded in multipole components. The field $\psi_j + i\chi_j$ of the conductor carrying the current $I_j$ at $r=a$ and $\theta = \theta_j$ is given by $$\psi_j + i\chi_j = \frac{\mu_0 I_j}{2\pi}\ln\left\{\left(\frac{r}{a}\right)e^{i(\theta-\theta_j)} - 1\right\}. \tag{15}$$

The field is given by $$-B_{\theta j} - iB_{rj} = \frac{\mu_0 I_j}{2\pi r}\left[1 - \left(\frac{r}{a}\right)^{-1} e^{-i(\theta-\theta_j)}\right]^{-1} \tag{16}$$

$$= \frac{\mu_0 I_j}{2\pi r}\left[1 + \left(\frac{r}{a}\right)^{-1} e^{-i(\theta-\theta_j)} + \left(\frac{r}{a}\right)^{-2} e^{-2i(\theta-\theta_j)} + \ldots\right]. \tag{17}$$

For the three-phase transmission line, the conductors are placed at $\theta_j = (j-1)(\frac{2}{3})\pi$ and the currents are $$I_j = I\cos(\omega t - \phi_j) \tag{18}$$

The magnetic field is given by $$-B_\theta - iB_r = \tag{19}$$

$$\frac{\mu_0 I}{2\pi r}\sum_{j=1}^{3}\cos(\omega t - \phi_j)\left[1 + \left(\frac{r}{a}\right)^{-1} e^{-i(\theta-\theta_j)} + \ldots\right].$$

The summation yields $$-B_\theta - iB_r = \frac{\mu_0 I a}{4\pi r^2}[\exp(i\omega t - i\theta) + \ldots]. \tag{20}$$

The magnitude is $$|B| \approx \frac{\mu_0 I a}{4\pi r^2} \quad \text{for } r >> a. \tag{21}$$

To reduce the field thus produced, three more conductors are added, making a total of six, as shown in FIG. 4D. The magnitude of the current in each conductor is reduced to a half. The positions and the phases are $\theta_k = \theta_j + \pi$ and $\phi_R = \phi_j$. The field is given by $$-B_\theta - iB_r = \frac{3\mu_0 I a^2}{4\pi r^3}[\exp(-i\omega t - 2i\theta) + \ldots].$$

for r>>a, this simplifies to:

$$|B| \simeq \frac{3\mu_0 I a^2}{4\pi r^3}. \qquad (22)$$

The improvement on the safe distance is given by $$r_q = (3arhd\ d^2)^{\frac{1}{4}} \qquad (23)$$

Hence, for example, with a=2.5 meters and $r_d$=120 meters, $r_q$=47.6 meters.

An alternative configuration moves two conductors of $\phi_j=0$ to the center, as shown in FIG. 4C. In this case, the field is given by $$|B| \simeq \frac{\sqrt{5}\ \mu_0 I a^2}{4\pi r^3} \quad \text{for } r >> a \qquad (24)$$

and the safe distance is given by $$r_q = (\sqrt{5}\ ar_d^2)^{\frac{1}{3}}. \qquad (25)$$

In the above calculations, it has been assumed that the resistive loss is the same for a given power rating and the total amount of conductor is the same. While added cost results from the suspension and the high voltage insulation of the extra conductors, as well as the modified structure of the support towers, it is believed that this added cost is more than justified by the reduced ELF hazard.

As described above, it is thus seen that the present invention provides a high power transmission line that reduces the electromagnetic radiation surrounding the transmission line, thereby reducing and minimizing the possible health risks associated with long-term exposure to or presence in zones surrounding such high power transmission line.

As also evident from the above description, the present invention provides particular spatial arrangements for use with a three or four conductor single phase high voltage transmission line that minimizes electromagnetic radiation surrounding the line conductors. Further, the invention also provides additional particular spatial arrangements for use with a five or six conductor three phase high voltage transmission line that likewise minimizes electromagnetic radiation surrounding the line conductors.

While the invention herein disclosed has been described by means of specific embodiments and applications thereof, numerous modifications and variations could be made thereto by those skilled in the art without departing from the scope of the invention set forth in the claims.

What is claimed is:

1. A power line distribution system for continuously distributing high voltage electrical power over long distances from a power source to a desired load comprising:
   (a) at least three power line conductors, said conductors being connected to appropriate terminals of said power source and said load such that each of said power line conductors carries an electrical current to or from said load as the high voltage electrical power is delivered to said load;
   (b) spatial positioning means for maintaining a prescribed spatial relationship between said at least three power line conductors, said spatial positioning means including a plurality of spaced-apart towers at regular intervals for supporting said power line conductors above the ground in said prescribed spatial relationship;
   (c) said prescribed spatial relationship causing electromagnetic fields generated around a first group of said at least three power line conductors as sensed in a region of interest below said power line conductors to oppose electromagnetic fields generated around a second group of said at least three power line conductors as sensed in said region of interest, the magnitude of a net electromagnetic field as sensed in said region of interest thereby being reduced;
   (d) whereby the effects associated with electromagnetic radiation generated around said power line conductors in the region of interest are minimized.

2. The power line distribution system as defined in claim 1 wherein said at least three power line conductors comprises three, a first conductor of said three power line conductors being of an opposite polarity to a second and third conductor of said three power line conductors, the current flowing in each of said second and third conductors being equal to one half of, and flowing in the opposite direction as, the current flowing in said first conductor; and wherein said prescribed spatial relationship, as viewed in a cross sectional plane, positions said first, second, and third conductors in a generally horizontal plane, said first conductor being in the center of and equidistant from said second and third conductors.

3. The power line distribution system as defined in claim 1 wherein said at least three power line conductors comprises four, a first and third conductor of said four power line conductors being of an opposite polarity to a second and fourth conductor of said four power line conductors, the current flowing in each of said first and third conductors being equal to, and flowing in the opposite direction as, the current flowing in each of said second and fourth conductors; and wherein said prescribed spatial relationship, as viewed in a cross sectional plane, positions each of said first and third conductors equidistant from each of said second and fourth conductors.

4. The power line distribution system as defined in claim 1 wherein said at least three power line conductors comprises five, a first conductor of said five power line conductors conducting power to said load in accordance with a first phase, a second and fourth conductor of said five power line conductors conducting power to said load in accordance with a second phase, and a third and fifth conductor of said five power line conductors conducting power to said load in accordance with a third phase; and wherein said prescribed spatial relationship, as viewed in a cross sectional plane, positions said first conductor equidistant from each of said second, third, fourth, and fifth conductors, said first, second and fourth conductors being aligned in a substantially straight line, and said first, third and fifth conductors being aligned in a substantially straight line.

5. The power line distribution system as defined in claim 1 wherein said at least three power line conductors comprises six, a first and fourth conductor of said six power line conductors conducting power to said load in accordance with a first phase, a second and fifth conductor of said six power line conductors conducting power to said load in accordance with a second phase, and a third and sixth conductor of said six power line conductors conducting power to said load in accordance with a third phase; and wherein said prescribed spatial relationship, as viewed in a cross sectional plane, positions said six power line conductors equidistant from a center point and equally spaced around said center point, said first and fourth conductors being on opposite sides of said center point and being aligned in a first straight line passing through said center point, said second and fifth conductors being on opposite sides of said center point, and being aligned in a second straight line passing through said center point, and said third and sixth conductors being on opposite sides of said center point and being aligned in a third straight line passing through said center point.

6. A high voltage power line spatial arrangement for use with a high voltage single phase transmission line that distributes continuous high voltage electrical power over long distances from a power source to a desired load, said spatial arrangement minimizing the possible harmful health effects of power line electromagnetic radiation, said single phase transmission line including at least three power line conductors, each of said at least three power line conductors sharing at least a portion of the electrical current delivered to or returned from said load through said high voltage transmission line, each fo said at least three power line conductors thereby having an electromagnetic field generated therearound by the respective electrical current in said conductor, said spatial arrangement comprising a spatial configuration that places said at least three power line conductors, as viewed in a cross sectional plane of the transmission line, in an ordered array, a first power line conductor in said ordered array being equidistant from a second and third power line conductors in said ordered array.

7. The high voltage power line spatial arrangement as defined in claim 6 wherien said at least three power line conductors comprises three, and wherein said first, second and third power line conductors, as viewed in said cross sectional plane, are aligned in a straight line.

8. The high voltage power line spatial arrangement as defined in claim 6 wherein said at least three power line conductors comprise four power line conductors, a fourth power line conductor being spaced apart from said first power line conductor and being the same distance from said second and third power line conductors, as is said first power line conductor, as viewed in said cross sectional plane.

9. A high voltage power line spatial arrangement for use with a high voltage three phase transmission line that distributes continuous high voltage electrical power over long distances from a power source to a desired load, said spatial arrangement minimizing the possible harmful health effects of power line electromagnetic radiation, said three phase transmission line including at least five power line conductors, each fo said at least five power line conductors sharing at least a portion of the electrical current delivered to or returned from said load through said high voltage transmission line, each of said at least five power line conductors thereby having an electromagnetic field generated therearound by the respective electrical current in said conductor, said spatial arrangement comprising a spatial configuration that places said at least five power line conductors, as viewed in a cross sectional plane of the transmission line, in an ordered array, a first power line conductor in said ordered array being equidistant from a second and third power line conductor in said ordered array.

10. The high voltage power line spatial arrangement as defined in claim 9 wherein said three phase transmission line constitutes five power line conductors, and wherein said ordered arrar comprises a rectangular array, as viewed in a cross sectional plane, said first power line conductor being in the center of said rectangular array, and said second, third, fourth, and fifth power line conductors being at respective corners of said rectangular array.

11. The high voltage power line spatial arrangement as defined in claim 9 wherein said three phase transmission line constitutes six power line conductors, and wherein said ordered array comprises a hexagonal array, each of said power line conductors being at respective corners of said hexagonal array.

* * * * *

UNITED STATES PATENT AND TRADEMARK OFFICE
CERTIFICATE OF CORRECTION

PATENT NO. : 5,068,543

DATED : November 26, 1991

INVENTOR(S) : Ohkawa

It is certified that error appears in the above-identified patent and that said Letters Patent is hereby corrected as shown below:

Column 3, line 53, after "in" insert --conjunction--. Column 5, line 57, change "crosssection" to --cross-section--. Column 6, line 25, change "isomagnetic" to --iso-magnetic--. Column 6, lines 57-58, there should not be a paragraph return after "x and y" and "components" should not start a new sentence. Column 9, line 34, change "x" to --$\pi$--. Column 9, line 50, change "x" to --$\pi$--. Column 11, line 2, change "$\pi/1$" to --$\pi/2$--. Column 11, line 35, change "$r_q \propto (a\, r_d 2)^{1/3}$"

to

--$r_q \propto (a\, r_d^2)^{1/3}$--

Column 11, line 42, after "always" delete the comma.

Column 12, lines 7-9, change

"$r_q - [a\, r_d 2/2]^{1/3}$"  (14)

to

--$r_q - [a\, r_d^2/2]^{1/3}$.--  (14)

Column 12, line 36, change "$\theta_j = (j-1)(1/3)\pi$" to --$\theta_j = (j-1)(2/3)\pi$--.

Column 13, lines 6-8, change $r_q - (3arhd^2)^{1/3}$ --.  (23)

to

--$r_q - (3a\, r_d^2)^{1/3}$.--  (23)

Column 13, lines 21-23, change

"$r_q - (\sqrt{5}\, a\, r_d 2)^{1/3}$."  (25)

to

--$r_q - (\sqrt{5}\, a\, r_d^2)^{1/3}$.--  (25)

UNITED STATES PATENT AND TRADEMARK OFFICE
CERTIFICATE OF CORRECTION

PATENT NO. : 5,068,543

DATED : November 26, 1991

INVENTOR(S) : Ohkawa

It is certified that error appears in the above-identified patent and that said Letters Patent is hereby corrected as shown below:

Claim 6, column 15, line 28, change "fo" to --of--. Claim 6, column 15, line 36, change "conductors" to --conductor--. Claim 7, column 15, line 39, change "wherien" to --wherein--. Claim 9, column 16, line 15, change "fo" to --of--. Claim 10, column 16, line 32, change "arrar" to --array--.

Signed and Sealed this

Fifteenth Day of June, 1993

Attest:

MICHAEL K. KIRK

Attesting Officer

Acting Commissioner of Patents and Trademarks